Figure 1:
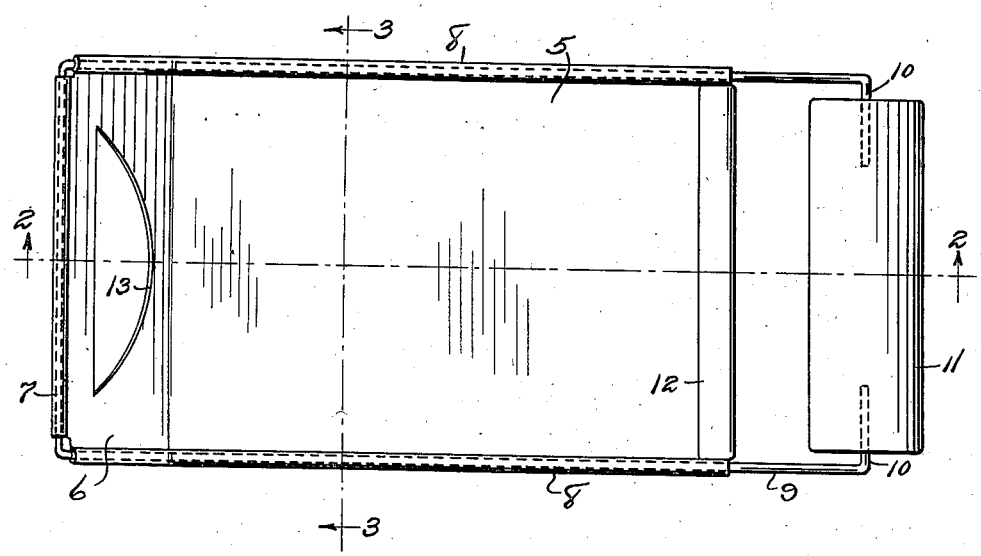

Dec. 16, 1941.  W. H. JONES  2,266,209
CORN CUTTER
Filed Aug. 30, 1938

William H. Jones
INVENTOR
BY Victor J. Evans & Co.
ATTORNEYS

UNITED STATES PATENT OFFICE 2,266,209

CORN CUTTER

William H. Jones, San Antonio, Tex.

Application August 30, 1938, Serial No. 227,581

1 Claim. (Cl. 30—280)

My invention relates to culinary devices and more particularly to that class known as corn cutters.

One of the principal objects of my invention is to provide, in a single implement, novel means for removing corn from the cob.

Another object of my invention is to provide a device of the above described character which is simple in construction, durable in use, efficient in operation and economical in manufacture.

A further object of my invention is to provide a device of the character described so constructed and arranged that the entire device, with the exception of the operating handle and reenforcing means, may be formed from a single sheet of suitable metal.

Other objects and advantages will be apparent from the following description, appended claim and annexed drawing.

Referring to the drawing wherein like reference characters designate like parts throughout the several views:

Figure 1 is a plan view of my invention.

Figure 2:
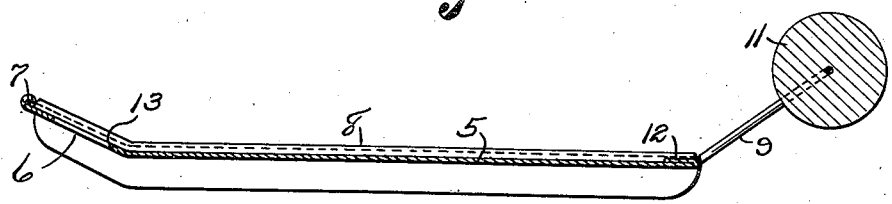
Figure 3:
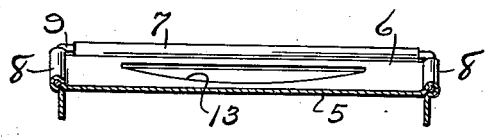

Figures 2 and 3 are sectional views taken on the lines 2—2 and 3—3 of Figure 1 respectively.

My novel corn cutter comprises a body 5 of relatively stiff material, for instance metal, of an elongated rectangular configuration in plan. Said body 5 is fashioned at the front end thereof with an upwardly and outwardly inclined section 6 terminating at the outer end in a rolled rib 7. The sides of the body are likewise formed with rolled ribs 8 and extending through said ribs 7 and 8 is a reenforcing rod or wire 9, the latter terminating at the rear end of said body in right angularly and inwardly disposed free ends 10 on which is secured a transversely extending handle 11. The body, at the rear end thereof, is provided with a transversely extending reenforcing strip 12 to lend rigidity to said body during the operation thereof. The inclined section 6, adjacent the jointure with the body, is slotted to provide a blade having a concave cutting edge 13 as clearly illustrated in the drawing.

In use, an ear of corn or the like is held in one of the operator's hands while the device is grasped by the handle with the other hand and drawn over the ear of corn thereby removing kernels therefrom over a longitudinally extending area of the cob. Continued rotation of the ear of corn in a hand after each removing operation effects a complete removing of the kernels from the cob.

From the foregoing it will be apparent that I have provided a simple and efficient device whereby kernels may be removed from ears of corn in an efficient manner and within a minimum amount of time. It is to be distinctly understood that various changes and modifications in the construction and arrangement of the parts may be resorted to without departing from the spirit of the invention or scope of the appended claim.

What I claim is:

A device for cutting kernels of corn from a cob comprising an elongated rectangular shaped body of flat stiff material, the front edge of the body being rolled to form a transversely extending roll edge portion thereat and the longitudinal side edges of the body sheet rolled throughout the length of the body, the said side edge portion being bent to form a longitudinally extending flange projecting right angularly from the rolled side edges at the bottom of the body, a fragmentary portion at the forward part of the body being bent to assume an upturned formation with reference to the plane of the body, the said upturned front portion having a segmental shaped slot formed therein and elongated transversely of the body to form a straight edge adjacent the front end of the body and a curved arcuately shaped cutting edge directed rearwardly of the body, a rigid wire of approximately U-shaped configuration extended through the front and side rolled edges of the body and projecting rearwardly thereof, the said wire having inwardly directed transverse pivot forming extensions, and a cylindrical handle member rotatably supported on the said rear extensions of the wire to form a transversely extending handle spaced rearwardly of the rear edge of the body, the said rearwardly projecting portions of the wire being bent at an upward angle so that the handle assumes a position elevated with respect to the plane of the body.

WILLIAM H. JONES.